US012044394B2

(12) United States Patent
Li et al.

(10) Patent No.: US 12,044,394 B2
(45) Date of Patent: Jul. 23, 2024

(54) LIGHTING APPARATUS

(71) Applicant: XIAMEN LEEDARSON LIGHTING CO., LTD, Fujian (CN)

(72) Inventors: Xiang Li, Fujian (CN); Yongjun Bao, Fujian (CN); Shenghong Liu, Fujian (CN); Quan Lin, Fujian (CN); Yandong Zheng, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 0 days.

(21) Appl. No.: 17/193,899

(22) Filed: Mar. 5, 2021

(65) Prior Publication Data

US 2021/0278074 A1 Sep. 9, 2021

(30) Foreign Application Priority Data

Mar. 5, 2020 (CN) ......................... 202020261674.8
Sep. 11, 2020 (CN) ......................... 202021983366.2

(51) Int. Cl.

| | |
|---|---|
| ***F21V 29/70*** | (2015.01) |
| ***F21K 9/232*** | (2016.01) |
| ***F21K 9/233*** | (2016.01) |
| ***F21K 9/235*** | (2016.01) |
| ***F21V 29/502*** | (2015.01) |
| *F21Y 115/10* | (2016.01) |

(52) U.S. Cl.

CPC .............. *F21V 29/70* (2015.01); *F21K 9/232* (2016.08); *F21K 9/233* (2016.08); *F21K 9/235* (2016.08); *F21V 29/502* (2015.01); *F21Y 2115/10* (2016.08)

(58) Field of Classification Search

CPC ...... F21V 29/70; F21V 29/502; F21V 29/717; F21K 9/232; F21K 9/233; F21K 9/235
See application file for complete search history.

(56) References Cited

U.S. PATENT DOCUMENTS

| | | | | |
|---|---|---|---|---|
| 2006/0227558 A1* | 10/2006 | Osawa | F21V 29/773 362/351 | |
| 2013/0088848 A1* | 4/2013 | Lee | F21K 9/23 362/84 | |
| 2013/0271998 A1* | 10/2013 | Merschon | F21K 9/232 29/829 | |
| 2014/0160737 A1* | 6/2014 | Strelchuk | F21V 29/83 362/184 | |

* cited by examiner

*Primary Examiner* — Evan P Dzierzynski
*Assistant Examiner* — Nathaniel J Lee
(74) *Attorney, Agent, or Firm* — Chun-Ming Shih; LANWAY IPR SERVICES

(57) ABSTRACT

A lighting apparatus includes a light source plate, a light passing cover, a sleeve housing and an air tube. The light source plate is mounted with a LED module for emitting a light. The LED module faces to the light passing cover to allow the light to pass through. The LED module is enclosed within a container space. The sleeve housing has a first end supporting the light source plate. The Edison cap is fixed to a second end of the sleeve housing. The air tube has a top opening connected to the container space for guiding a heated air in the container space away from the container space via the air tube.

14 Claims, 10 Drawing Sheets

LIGHTING APPARATUS

FIELD

The present invention is related to a lighting apparatus, and more particularly related to a lighting apparatus with heat dissipation function.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

There are various light devices arranged in different places. Some light devices need to be powered in a high illumination level. When light intensity is increased in a high volume, large heat is generated and needs to be dissipated. Otherwise, the life span of the light device may be decreased dramatically.

In some environments, water proof is also an important factor. Therefore, it is beneficial to design a light device with multiple functions. There are various light devices arranged in different places. Some light devices need to be powered in a high illumination level. When light intensity is increased in a high volume, large heat is generated and needs to be dissipated. Otherwise, the life span of the light device may be decreased dramatically.

In some environments, water proof is also an important factor. Therefore, it is beneficial to design a light device with multiple functions. There are various light devices arranged in different places. Some light devices need to be powered in a high illumination level. When light intensity is increased in a high volume, large heat is generated and needs to be dissipated. Otherwise, the life span of the light device may be decreased dramatically.

In some environments, water proof is also an important factor. Therefore, it is beneficial to design a light device with multiple functions. There are various light devices arranged in different places. Some light devices need to be powered in a high illumination level. When light intensity is increased in a high volume, large heat is generated and needs to be dissipated. Otherwise, the life span of the light device may be decreased dramatically.

In some environments, water proof is also an important factor. Therefore, it is beneficial to design a light device with multiple functions.

SUMMARY

In some embodiments, a lighting apparatus includes a light source plate, a light passing cover, a sleeve housing and an air tube.

The light source plate is mounted with a LED module for emitting a light.

The LED module faces to the light passing cover to allow the light to pass through. The LED module is enclosed within a container space.

The sleeve housing has a first end supporting the light source plate.

The Edison cap is fixed to a second end of the sleeve housing.

The air tube has a top opening connected to the container space for guiding a heated air in the container space away from the container space via the air tube.

In some embodiments, the lighting apparatus may also include an optical unit for changing a light path of the light to the light passing cover.

In some embodiments, the optical unit is a lens defining a bottom cavity enclosing the LED module.

In some embodiments, the optical unit is a reflector cup with a bottom part and a top part on two sides.

The bottom part has a smaller diameter than the top part, the bottom part is closer to the LED module than the top part.

In some embodiments, the light source plate has an air passage connecting to the air tube for the heated air to enter the air tube via the air passage.

In some embodiments, the light passing cover presses the optical unit to engage the sleeve housing to fix the optical unit, and a glue is applied to a connection position between the light passing cover and the optical unit.

In some embodiments, a first peripheral edge of the optical unit has a buckle for fixing to a second peripheral edge of the light passing cover.

In some embodiments, the sleeve housing has a trumpet shape, the first end has a larger diameter than the second end.

In some embodiments, the sleeve housing has a metal layer wrapped with an insulation layer.

In some embodiments, the light passing cover is a bulb shell.

In some embodiments, the air tube is an elongated tube.

In some embodiments, an internal surface of sleeve housing provides a lateral wall for the air tube.

A top edge of the top opening of the air tube engages the light source plate.

In some embodiments, the lighting apparatus may also include a driver enclosed by the sleeve housing for converting an external power to a driving current supplied to the LED module.

The driver has a driver plate fixed to the light source plate perpendicularly.

In some embodiments, the driver plate divides a inner space of the sleeve housing into a first space and a second space.

A protruding driver component mounted on the driver plate is placed in the first space and the air tube is placed in the second space.

In some embodiments, the driver plate has a first driver part and a second part.

The first driver part has a first driver plate and the second driver part has a second driver plate.

The first driver plate is detachably plugged to the second plate to integrate as the driver.

In some embodiments, the air tube has a curve part for preventing water to enter.

In some embodiments, an air exit is disposed on an surface of the sleeve housing connected to the second opening of the air tube.

In some embodiments, the air tube is made of metal material.

In some embodiments, the air tube is wrapped with an insulation exterior layer.

In some embodiments, the second opening of the air tube is connected to a heat sink disposed inside the sleeve housing.

DETAILED DESCRIPTION

Figure 11:
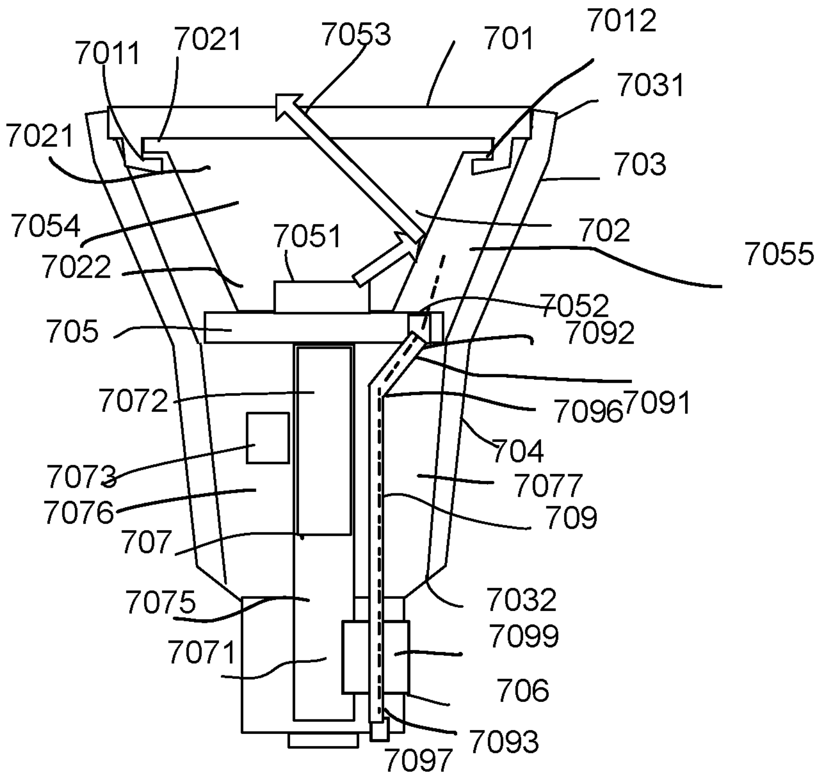
FIG. 11 illustrates another embodiment.

In FIG. 11, a lighting apparatus includes a light source plate 705, a light passing cover 701, a sleeve housing 703 and an air tube 709. The air tube 709 is an air channel for air to flow through. Multiple examples of the air tube 709 are illustrated and explained as follows.

The light source plate 705 is mounted with a LED module 7051 for emitting a light 7053.

The LED module 7051 faces to the light passing cover 701 to allow the light 7053 to pass through. The LED module 7051 is enclosed within a container space 7054. In this example, there is a reflective cup 702 for changing a light path of the light 7053. The inner wall of the reflective cup 702, the light source plate 705 and the light passing cover 701 in this example may construct the container space 7054. In such example, there is an air passage 7052 on the light source plate 705 for guiding heated air in the container space 7054 to exit from the container space 7054 via the air tube 709.

The reflective cup 702 may have holes for air to move between two sides of the reflective cup 702. Alternatively, even the reflective cup 702 conceals the container space 7054, the other container space 7055 may be used for moving air thereof via the air tube 709, too.

Such mechanism also prevents thermal deformation of the components if the container space 7054 is completely concealed for water proof. Heated air may expand and damage the components. In addition, heat dissipation may be enhanced via such design.

The sleeve housing 703 has a first end 7031 supporting the light source plate 705.

The Edison cap 706 is fixed to a second end 7032 of the sleeve housing 703.

The sleeve housing 703 may be a tube of various shapes, e.g. two ends with different diameters like a trumpet shape illustrated in FIG. 11.

The air tube has a top opening 7092 connected to the container space 7054 for guiding a heated air 7091 in the container space 7054 away from the container space 7054 via the air tube 709.

In some embodiments, the lighting apparatus may also include an optical unit 702 for changing a light path of the light to the light passing cover.

Figure 7:
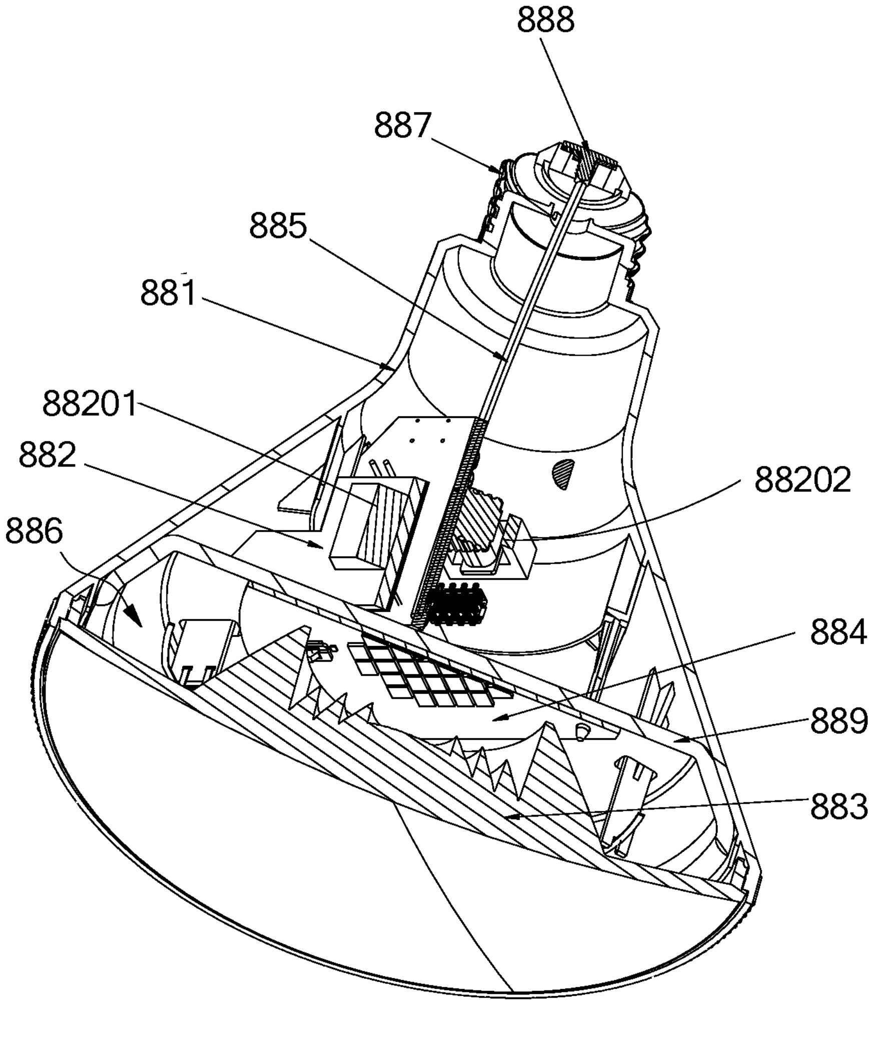
FIG. 7 illustrates a cross-sectional view of the lighting apparatus in FIG. 5.

In some embodiments, the optical unit is a lens defining a bottom cavity enclosing the LED module, as illustrated as the lens 883 in FIG. 7.

In some embodiments, the optical unit is a reflector cup with a bottom part and a top part on two sides, as the example illustrated in FIG. 11.

The bottom part 7022 has a smaller diameter than the top part 7021. The bottom part 7022 is closer to the LED module 7051 than the top part 7021, as shown in FIG. 11.

In some embodiments, the light source plate has an air passage 7052 connecting to the air tube 709 for the heated air 7091 to enter the air tube 709 via the air passage 7052.

In some embodiments, the light passing cover 701 presses the optical unit 702 to engage the sleeve housing 703 to fix the optical unit, and a glue 7012 is applied to a connection position between the light passing cover 701 and the optical unit 702.

Figure 5:
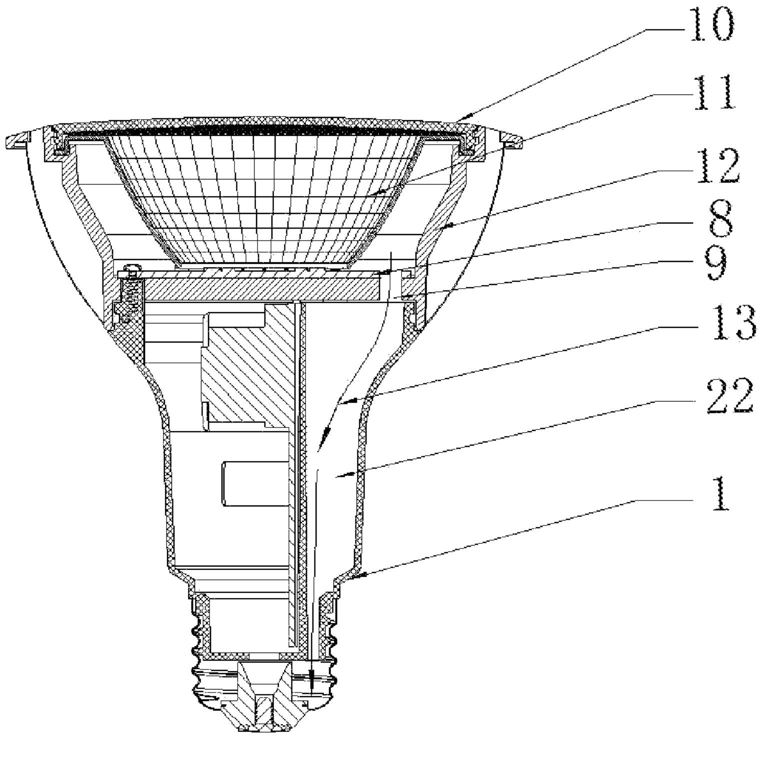
FIG. 5 illustrates a Par light apparatus.

In some embodiments, a first peripheral edge 7021 of the optical unit 702 has a buckle, as illustrated in FIG. 11 and FIG. 5 for fixing to a second peripheral edge of the light passing cover.

In FIG. 11, the sleeve housing has a trumpet shape. The first end 7031 has a larger diameter than the second end 7032.

Figure 12:
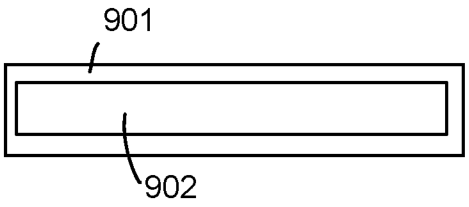
FIG. 12 illustrates a structure of a sleeve housing.

In FIG. 12, the sleeve housing has a metal layer 902 wrapped with an insulation layer 901.

Figure 4:
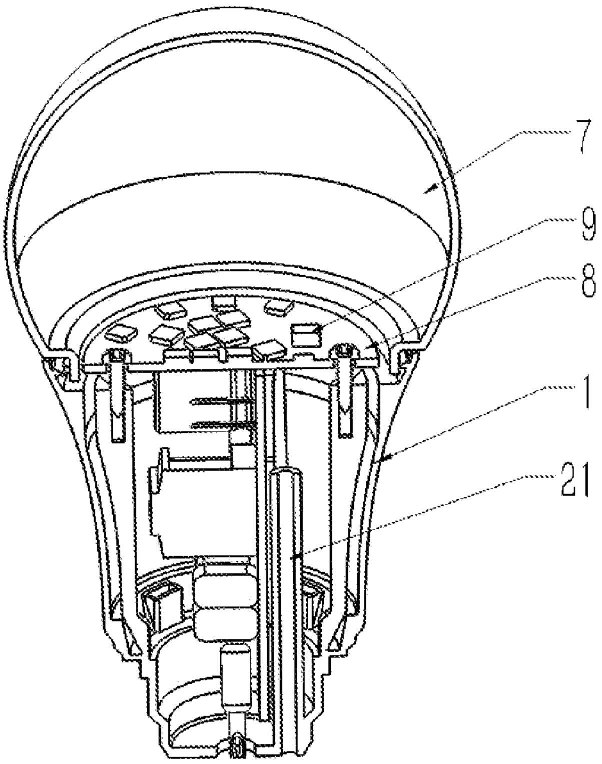
FIG. 4 illustrates a light bulb device example.

In FIG. 4, the light passing cover is a bulb shell 7.

Figure 1:
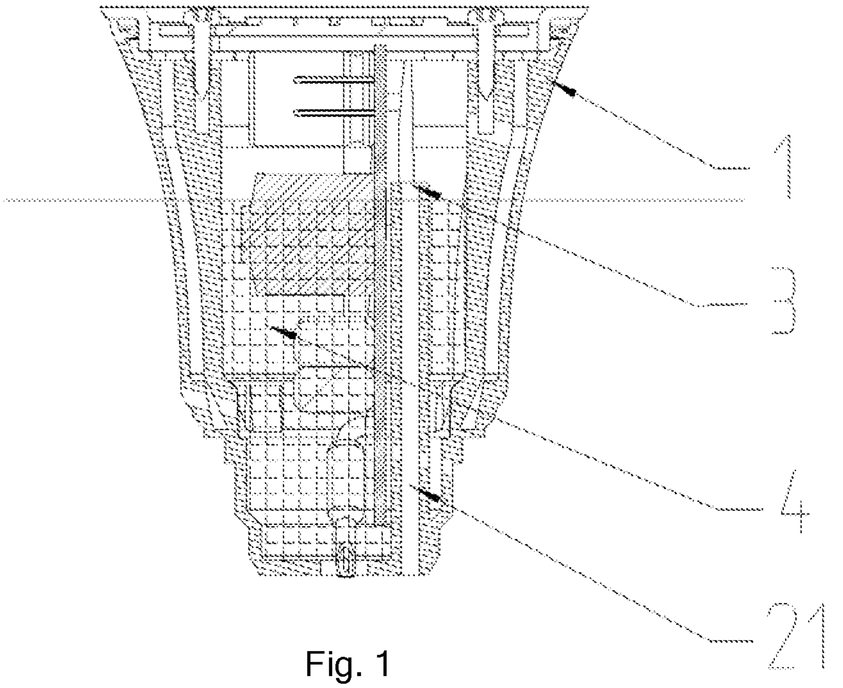
FIG. 1 illustrates a side view of a component of a lighting apparatus.

In FIG. 1, the air tube is an elongated tube 21.

Figure 2:
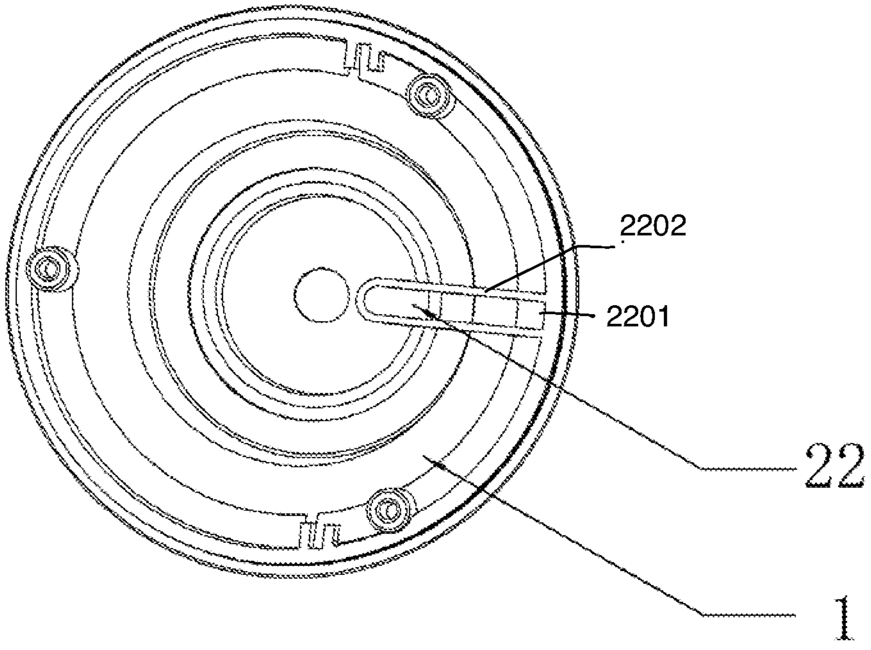
FIG. 2 illustrates a top view of the component of the lighting apparatus.

In FIG. 2, an internal surface 2201 of sleeve housing provides a lateral wall for the air tube 22.

A top edge 2202 of the top opening of the air tube 22 engages the light source plate.

In other words, the air tube may be used as a structure support for the lighting apparatus to support the light source plate.

In FIG. 11, the lighting apparatus may also include a driver 707 enclosed by the sleeve housing 703 for converting an external power to a driving current supplied to the LED module 7052. For example, the external power is an AC power to be converted to a DC power by the driver 707.

The driver 707 has a driver plate 7075 fixed to the light source plate 705 perpendicularly.

In some embodiments, the driver plate 7075 divides a inner space of the sleeve housing 703 into a first space 7076 and a second space 7077.

A protruding driver component 7073 mounted on the driver plate 7075 is placed in the first space 7076 and the air tube 709 is placed in the second space 7077.

In some embodiments, the driver plate has a first driver part 7072 and a second part 7071.

The first driver 7072 part has a first driver plate, a plate to mount with electronic components and the second driver part 7071 has a second driver plate, a plate to mount with electronic components. The two driver parts 7071, 7072 may have different functions. One is used to provide an enhanced function to anther, e.g. to add a communication function to a normal light device.

The first driver plate of the first driver part 7072 is detachably plugged to the second plate of the second driver part 7071 to integrate as the driver 707.

In FIG. 11, the air tube has a curve part 7096 for preventing water to enter. The curve part 7096 may have different curvature.

In some embodiments, an air exit 7097 is disposed on an surface of the sleeve housing 703 connected to the second opening 7093 of the air tube 709.

In some embodiments, the air tube is made of metal material.

In some embodiments, the air tube is wrapped with an insulation exterior layer, as the example of the sleeve housing illustrated in FIG. 12.

In some embodiments, the second opening of the air tube is connected to a heat sink 7099 disposed inside the sleeve housing. For example, the heat sink 7099 may have multiple fins or various structures for enhancing heat dissipation, e.g. protruding structures.

Please refer to FIG. 1, which shows a component in another embodiment of a lighting apparatus.

In FIG. 1, a sleeve housing 1 has an inner space for inserting other components. Heat dissipation glue 4 are inserted into the sleeve housing 1. The air tube 21 has an air passage 3 to receive heated air to flow through.

Please refer to FIG. 2, which illustrates a different air tube 22 that has an arc wall structure. A side wall of the air tube 22 may use an inner surface of the sleeve housing 1.

Figure 3:
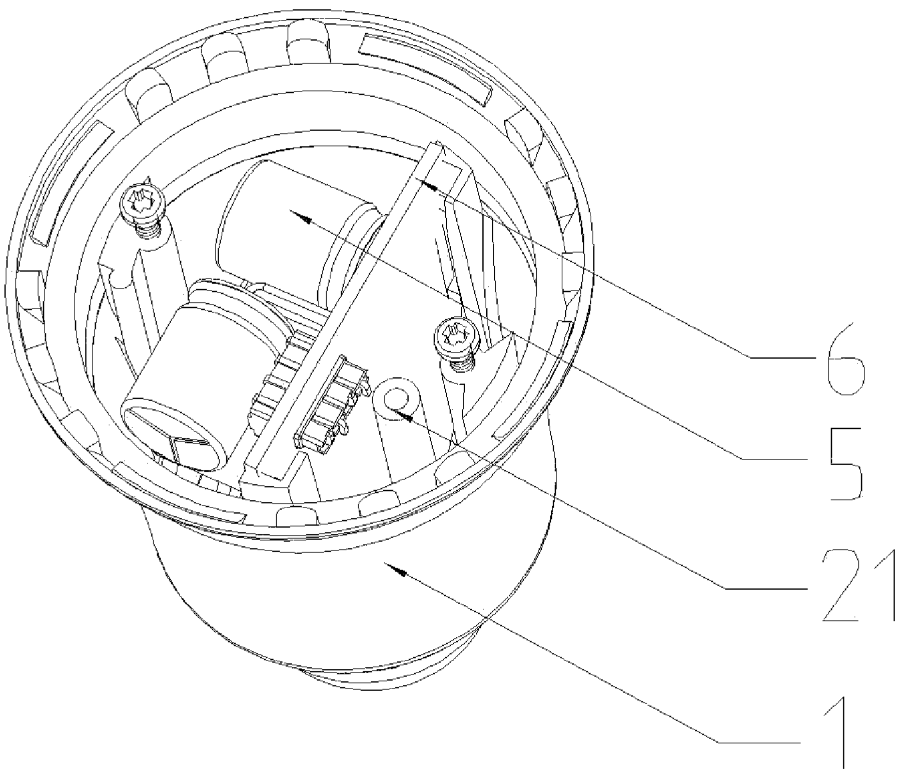
FIG. 3 illustrates a perspective view of the component of the lighting apparatus.

Please refer to FIG. 3, which shows a different view of the example in FIG. 2.

In FIG. 3, a driver 6 is placed via a track. There is a protruding driver component 5 like a capacitor. In this example, the air tube 21 is a tubular shape disposed inside the sleeve housing 1.

FIG. 4 shows a bulb device example. In FIG. 4, there is a bulb shell 7 as the light passing cover mentioned above. There is an air passage 9 dispose don the light source plate 8. The sleeve housing 1 supports the light source plate 8. There is an air tube 21 as mentioned above.

FIG. 5 shows another example as a par light device.

In FIG. 5, there is a light passing cover 10. There is a reflective cup 11. The sleeve housing 1 has an aluminum unit 12 for heat dissipation and for enhance structure strength. There is an air passage 9 on the light source plate 8. Heated air may flow along the arrow 13. There is an arc wall as illustrated in FIG. 2 as the air tube.

Figure 6:
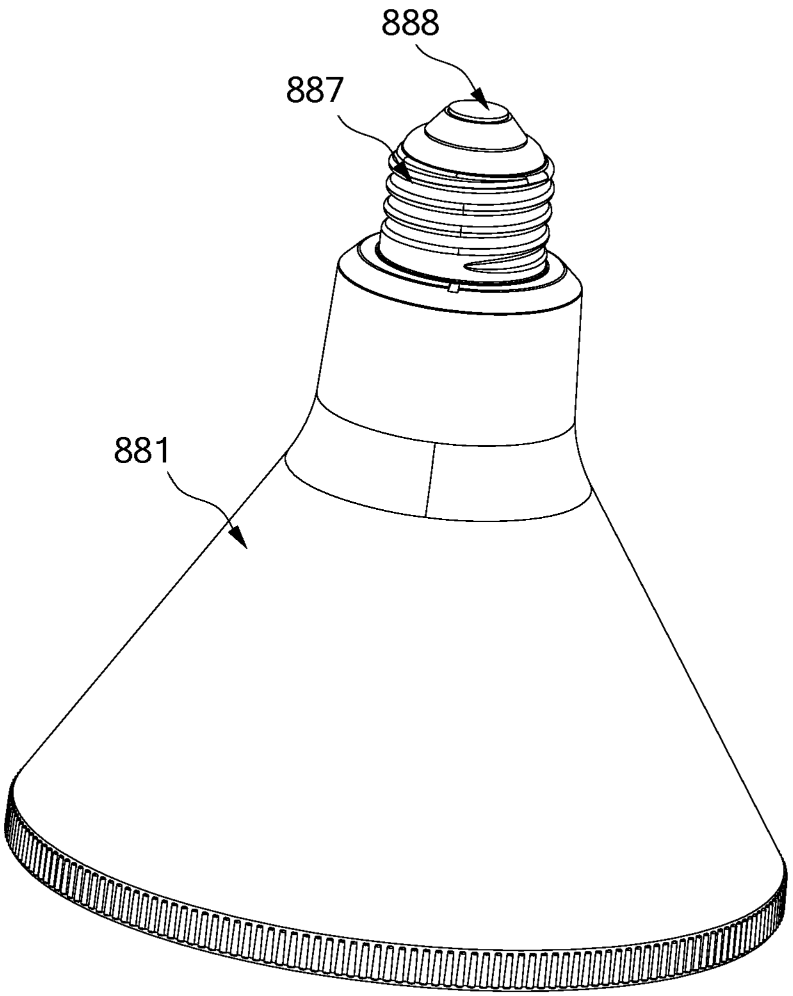
FIG. 6 illustrates a side view of the example in FIG. 5.

FIG. 6 shows another example. The lighting apparatus has an electrode 888 for an Edison cap 887. There is a trump shape sleeve housing 881.

In FIG. 7, which shows a cross-sectional view of the example of FIG. 6, shows more components.

In FIG. 7, an air tube 885 is used for transmitting heated air. There are a first driver plate 88201 and a second driver plate 88202 that are detachably connected so as to be replaced with other functions to enhance design flexibility while lowering down manufacturing cost. There is a driver component 882. There is lens 883 for condensing light or diffusing light of the light source plate 884. The sleeve housing 881 also has an aluminum cup 889 as a heat sink. The container space 886 is used for containing components like the light source plate 884.

Figure 8:
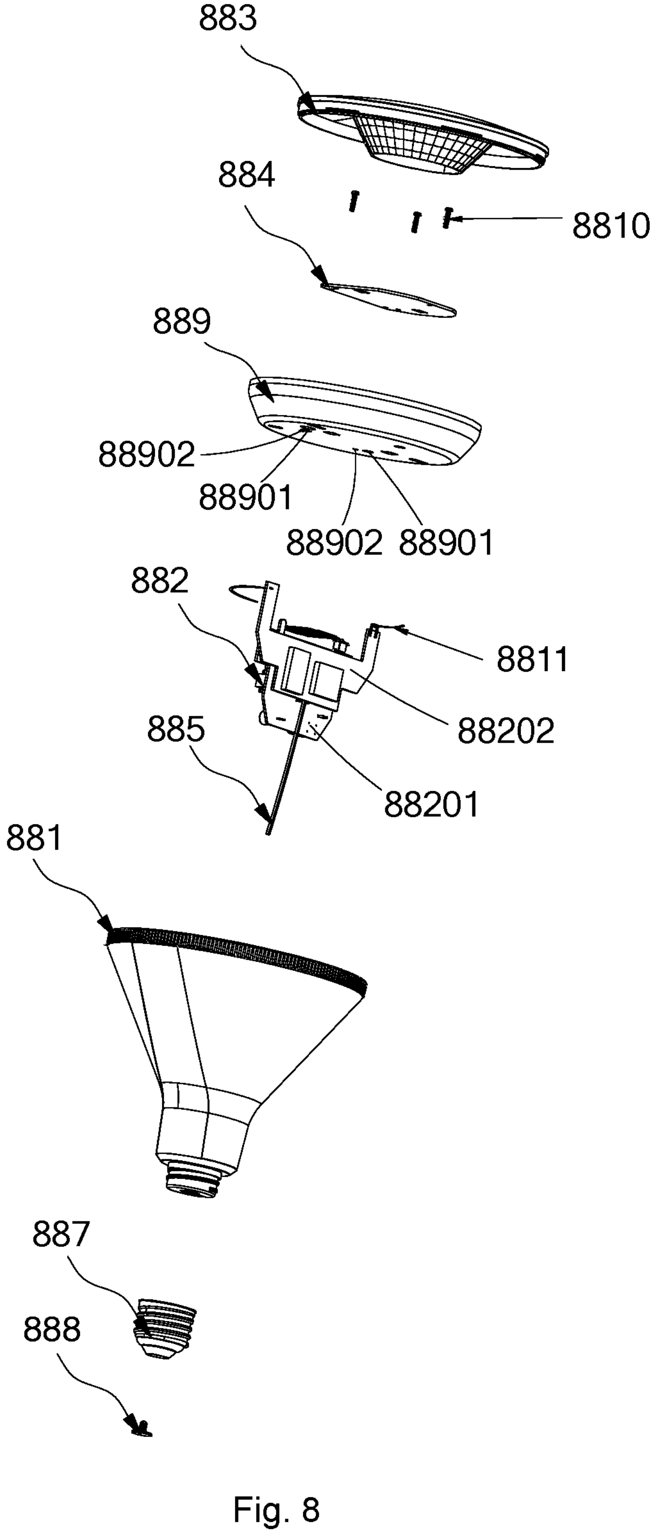
FIG. 8 illustrates an exploded view of the example in FIG. 5.

FIG. 8 shows an exploded view of the example in FIG. 7. In addition to the components mentioned in FIG. 7, there are a positioning hole 88902, connection holes 88901 to match screws 8810 to fix components together. There is also an arc shaped hanging unit 8811 to fix to the light source 884.

Figure 9:
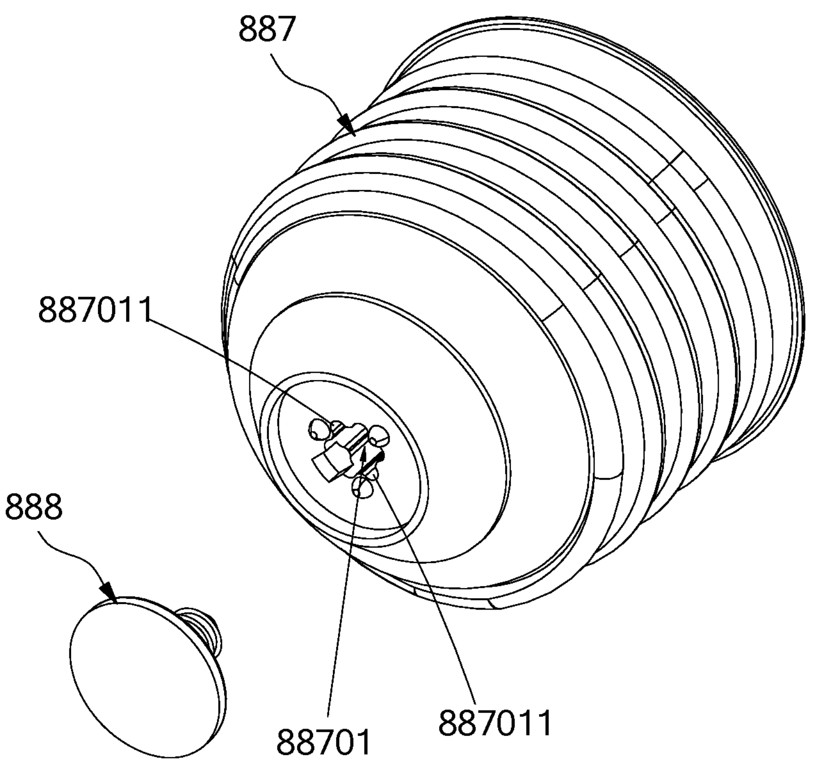
FIG. 9 illustrates a cap head of example of the lighting apparatus.

FIG. 9 shows an air exit 887011 disposed on an Edison cap 887 close to the installation hole 88701 to install an electrode 888.

Figure 10:
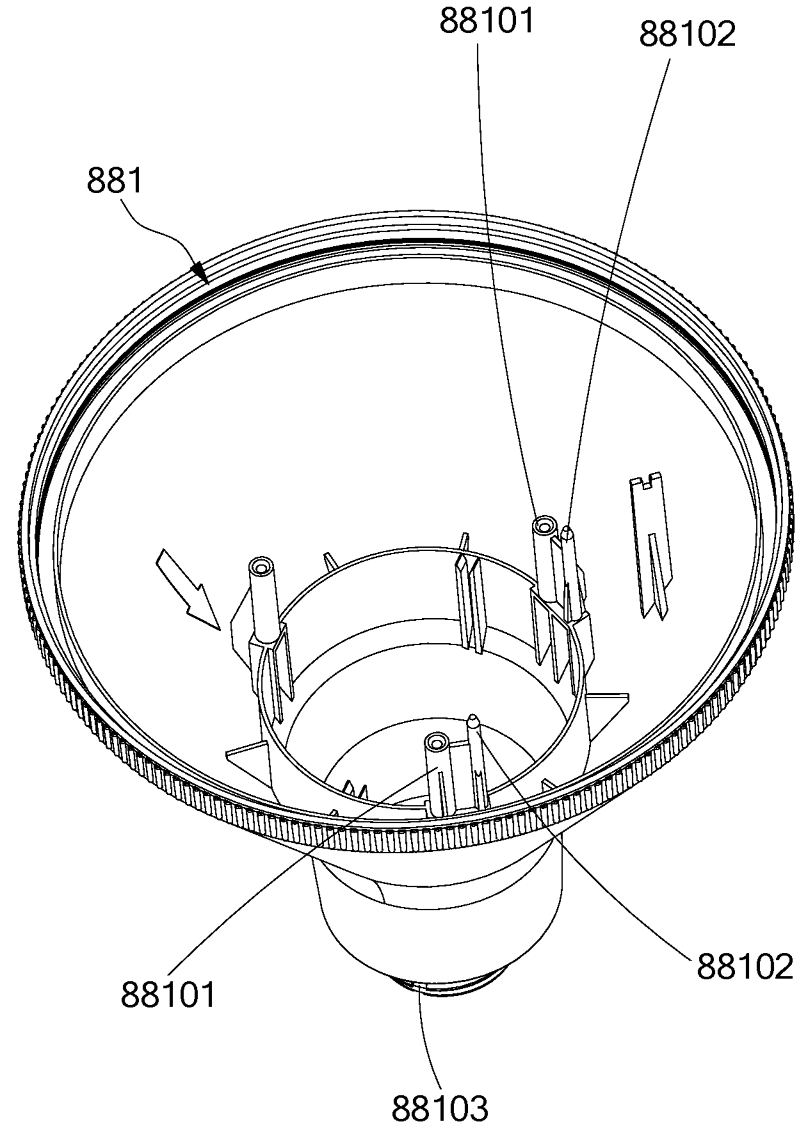
FIG. 10 illustrates a top view of a sleeve housing example.

FIG. 10 shows a connecting column 88101 and a positioning column 88102 disposed on a sleeve housing 881 for aligning connection to a light source plate. There is a wire groove 88103 for guiding wires to be connected.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a light source plate mounted with a LED module for emitting a light;

a light passing cover, wherein the LED module faces to the light passing cover to allow the light to pass through, the LED module is enclosed within a container space;

a sleeve housing with a first end supporting the light source plate;

an Edison cap fixed to a second end of the sleeve housing; and an air tube with a top opening connected to the container space for guiding a heated air in the container space away from the container space via the air tube, wherein the air tube is an elongated tube, wherein an internal surface of the sleeve housing provides a lateral wall for the air tube, a top edge of the top opening of the air tube engages the light source plate, wherein the air tube has a curve part for preventing water to enter inside the sleeve housing, wherein the air tube is made of metal material, wherein the air tube is wrapped with an insulation exterior layer, wherein an air exit is disposed on a surface of the sleeve housing connected to the second opening of the air tube for air to exit from the air tube.

2. The lighting apparatus of claim 1, further comprising an optical unit for changing a light path of the light to the light passing cover.

3. The lighting apparatus of claim 2, wherein the optical unit is a lens defining a bottom cavity enclosing the LED module.

4. The lighting apparatus of claim 2, wherein the optical unit is a reflector cup with a bottom part and a top part on two sides, the bottom part has a smaller diameter than the top part, the bottom part is closer to the LED module than the top part.

5. The lighting apparatus of claim 4, wherein the light source plate has an air passage connecting to the air tube for the heated air to enter the air tube via the air passage.

6. The lighting apparatus of claim 2, wherein the light passing cover presses the optical unit to engage the sleeve housing to fix the optical unit, and a glue is applied to a connection position between the light passing cover and the optical unit.

7. The lighting apparatus of claim 6, wherein a first peripheral edge of the optical unit has a buckle for fixing to a second peripheral edge of the light passing cover.

8. The lighting apparatus of claim 1, wherein the sleeve housing has a trumpet shape, the first end has a larger diameter than the second end.

9. The lighting apparatus of claim 8, wherein the sleeve housing has a metal layer wrapped with an insulation layer.

10. The lighting apparatus of claim 1, wherein the light passing cover is a bulb shell.

11. The lighting apparatus of claim 1, further comprising a driver enclosed by the sleeve housing for converting an external power to a driving current supplied to the LED module, the driver has a driver plate fixed to the light source plate perpendicularly.

12. The lighting apparatus of claim 11, wherein the driver plate divides a inner space of the sleeve housing into a first space and a second space, a protruding driver component mounted on the driver plate is placed in the first space and the air tube is placed in the second space.

13. The lighting apparatus of claim 11, wherein the driver plate has a first driver part and a second part, the first driver part has a first driver plate and the second driver part has a second driver plate, the first driver plate is detachably plugged to the second plate to integrate as the driver.

14. The lighting apparatus of claim 1, wherein the second opening of the air tube is connected to a heat sink disposed inside the sleeve housing.

* * * * *